US008118255B1

(12) United States Patent
Monson et al.

(10) Patent No.: US 8,118,255 B1
(45) Date of Patent: Feb. 21, 2012

(54) VEHICLE ENERGY ABSORPTION (75) Inventors: Robert J. Monson, St. Paul, MN (US); John P. Abraham, Minneapolis, MN (US); Joseph V. Crimando, New Richmond, WI (US); Joel E. Farley, St. Paul, MN (US); Matthew F. Linder, Easton, MN (US); Joel T. Seipel, Rapid City, SD (US)

(73) Assignee: Lockheed Martin Corporation, Bethesda, MD (US)

( * ) Notice: Subject to any disclaimer, the term of this patent is extended or adjusted under 35 U.S.C. 154(b) by 722 days.

(21) Appl. No.: 12/286,984

(22) Filed: Oct. 3, 2008

(51) Int. Cl.
*B64F 1/02* (2006.01)
(52) U.S. Cl. .................................. 244/110 R; 244/110 F
(58) Field of Classification Search .............. 244/110 R, 244/110 F
See application file for complete search history.

(56) References Cited

U.S. PATENT DOCUMENTS

| | | | |
|---|---|---|---|
| 3,901,988 A * | 8/1975 | Coles et al. .................. 428/35.2 |
| 4,431,182 A | 2/1984 | Reynolds | |
| 4,819,915 A * | 4/1989 | Cargnel ....................... 256/12.5 |
| 4,979,701 A * | 12/1990 | Colarik et al. ............ 244/110 C |
| 5,560,568 A | 10/1996 | Schmittle | |
| 5,643,139 A | 7/1997 | Stout et al. | |
| 7,219,856 B2 | 5/2007 | Watts et al. | |
| 7,686,247 B1 * | 3/2010 | Monson et al. ........... 244/110 R |
| 7,798,445 B2 * | 9/2010 | Heppe et al. .............. 244/110 E |

* cited by examiner

*Primary Examiner* — Joshua Michener
*Assistant Examiner* — Medhat Badawi
(74) *Attorney, Agent, or Firm* — Brooks, Cameron & Huebsch, PLC (57) ABSTRACT

The present disclosure includes various apparatus, system, and method embodiments for vehicle energy absorption. One embodiment includes an inflatable structure for impact of a vehicle thereon and one or more cords coupled to one or more deflation vents on the inflatable structure, where at least one of the one or more cords is an activation mechanism to activate the deflation vent upon impact of the vehicle.

20 Claims, 4 Drawing Sheets

VEHICLE ENERGY ABSORPTION

FIELD OF THE DISCLOSURE

The present disclosure generally relates to vehicle energy absorption. And, in particular, the present disclosure relates to inflatable structures and methods for vehicle energy absorption and vehicle capture.

BACKGROUND

Capturing vehicles, for example, where space for capture may be limited while preventing damage to the vehicle and/or its payload, by absorbing the energy of the vehicle, which can include valuable electronic components and/or information stored thereon, is desirable in many instances. Such vehicles, which can include various unmanned aerial vehicles (UAVs) among other air, land, and/or sea vehicles, can often be reused. As such, safe capture of such vehicles can provide cost, manufacturing, supply, and/or materials savings, among other benefits.

Some current methods of energy absorption of vehicles include using parachutes, parafoils, nets, cable arresting devices, or a combination thereof. Some such methods and/or devices can be complicated, time consuming, difficult to erect/teardown, and/or can be difficult to integrate in small areas (e.g., on a ship deck having limited area). Such methods may not provide adequate energy absorption to sufficiently protect the vehicle and/or its payload.

SUMMARY

Embodiments of the present disclosure provide various methods, systems, and apparatuses for vehicle energy absorption. Various embodiments provide for absorbing energy of an aerial vehicle such as an unmanned aerial vehicle (UAV) reducing or minimizing the causing of damage to the vehicle and/or its payload. In various embodiments, the apparatus can have a small footprint, can be portable, and/or can be rapidly inflated to provide a vehicle energy absorption area.

When a vehicle impacts a vehicle energy absorption apparatus, such as an inflatable structure, the vehicle harbors a significant amount of kinetic energy. The energy absorption apparatus, according to various embodiments of the present disclosure, can at least partially absorb kinetic energy while decelerating the vehicle by transferring the kinetic energy into a less volatile form.

For example, an inflatable structure can elastically deform upon impact of the vehicle, thereby absorbing a portion of the kinetic energy of the vehicle. Additional energy can be absorbed by dampening the impact, for instance, by at least partially deflating the inflatable structure upon impact of the vehicle. Additionally, the impact of the vehicle can do work in the form of moving the inflated device or changing the shape of the device, all of which reduce the system energy of the vehicle.

Accordingly, embodiments can include an inflatable structure for impact of a vehicle thereon and one or more cords coupled to one or more deflation vents on the inflatable structure, where at least one of the one or more cords is an activation mechanism to activate the deflation vent upon impact of the vehicle. Such embodiments may be useful to exhaust fluid from the inflatable structure to dampen the impact of the vehicle, among other uses.

In various embodiments, the apparatus can include a netting portion within at least a portion of the energy absorption apparatus and attached to at least a portion of the inflatable structure. In such embodiments, the netting portion can provide a cushioning functionality, in which the netting portion cushions the impact of the vehicle. In some embodiments, the netting portion can be used to capture the vehicle.

In one or more embodiments, the inflatable structure can include a number of inflatable support members. In some embodiments the inflatable support members can be interconnected (e.g., in fluid communication). For instance, the inflatable support members can be connected by at least one netting portion.

In such embodiments, at least one cord can be coupled to one or more deflation vents on more than one inflatable support member. Activating multiple deflation vents in various locations on an inflatable structure can more rapidly and evenly deflate the structure to absorb vehicle energy more efficiently and/or provide a reduced potential for damage to the vehicle and/or vehicle components and/or operators within the vicinity of the system.

In various embodiments, the apparatus can include a number of deflation vents through which the fluid in the apparatus can be exhausted when a vehicle (e.g., an UAV) impacts the target area. The deflation vents can be located on a number of the inflatable support members.

In some embodiments, at least one of the one or more cords can be a component of the netting portion. In such embodiments, at least one strand of the netting portion can be coupled to one or more deflation vents as the cord described above. Using a component of the netting portion as the cord may reduce materials costs associated with the energy absorption apparatus, among other benefits.

In various embodiments, at least one of the one or more cords can be a component separate from the netting portion. In such embodiments, the cord can be interspersed within the netting portion and/or be coupled to the inflatable structure and at least one deflation vent separately from the netting portion. Those of ordinary skill in the art will understand that other cord positioning, orientation, and/or arrangements are possible.

A vehicle energy absorption system, according to embodiments of the present disclosure, can include sensors coupled to the number of cords, the number of deflation vents, and/or a controller. For example, the controller can receive a signal from the sensors indicating a status of the number of cords (e.g., flexed or relaxed) and/or a status of the number of deflation vents (e.g., open or closed). Such information can allow the controller to take appropriate action upon impact of a vehicle on the inflatable structure as will be described below.

The system can include a number of actuators coupled to the number of deflation vents and to the controller. In some embodiments, the controller can have logic for controlling the number of actuators and/or an inflation source. In such embodiments, logic on the controller can send a signal to at least one of the number of actuators to activate deflation vents when the signal from the number of sensors indicates that at least one of the number of cords is flexed beyond a threshold amount and/or at least one of the deflation vents is activated. Such embodiments can provide additional deflation of the inflatable structure upon impact of a vehicle thereon by activating (e.g., opening) a number of, or all, deflation vents when at least one is activated or when a cord is flexed indicating impact of a vehicle.

In one or more embodiments, the activation mechanism (e.g., one or more cords) can activate one or more deflation vents to at least partially deflate the inflatable structure when impact of the vehicle (e.g., UAV) deforms the inflatable structure sufficiently to cause the cord to flex. For example, a vehicle can impact the inflatable structure with sufficient kinetic energy to cause an inflatable support member to deflect and thereby cause a corresponding cord to flex by more than a threshold amount. In some embodiments, a cord that is coupled to a deflation vent (e.g., to a cover on a deflation vent) can activate (e.g., open) the deflation vent when the cord is flexed beyond a threshold amount. A determination of a threshold amount can depend upon such factors as material used to fabricate the inflatable structure, type of deflation vent, and type of vehicle intended to be captured, among others.

In some embodiments, the netting portion coupled to the inflatable structure can be used to capture a vehicle (e.g., a UAV). In such embodiments, the vehicle impacting the netting portion can cause a cord to flex and activate at least one deflation vent (e.g., by pulling the at least one deflation vent open via the flexed cord). For instance, activating at least one deflation vent can help to dampen the impact of the vehicle, and absorb vehicle energy, by at least partially deflating the inflatable structure. Such embodiments can be beneficial in protecting the vehicle and/or vehicle components, among other benefits.

In various embodiments, one or more deflation vents can be activated upon impact of a vehicle directly on an activation mechanism, such as a cord. For example, an inflatable structure can have a target area for impact of a vehicle that is crossed by one or more cords. In this example, a vehicle can directly impact an activation mechanism (e.g., a cord) at approximately the same time as impact with the inflatable structure. Such impact directly on the cord can cause it to flex by more than a threshold amount and thereby activate one or more deflation vents.

In some embodiments, a number of deflation vents can remain in a partially open state while the inflatable structure is in an inflated state. That is, the vents can be configured such that a suitable pressure is maintained within the inflatable structure when the apparatus includes a number of partially open vents.

Upon a vehicle impact to the apparatus, the fluid within the inflatable structure can be exhausted through the deflation vents such that the inflatable structure collapses around the vehicle, and cushions the vehicle as it is captured. This can be activated, for example, when the pressure in the inflatable structure, or a portion thereof, exceeds a certain threshold value due to impact.

In various embodiments, the activation mechanism (e.g., cord) can activate the deflation vent by at least partially opening the deflation vent (e.g., when the deflation vent was in a closed state prior to activation). For example, a deflation vent can include a number of substantially parallel slats coupled (e.g., hingedly attached) to an actuator and/or cord that can open, close, and/or adjust the vent between an opened and closed state (e.g., by rotating the slats along a longitudinal axis). Such embodiments can be useful, among other uses, for providing an ability to quickly reinflate the inflatable structure, after deflating it, by closing the vent (e.g., by using the actuator to close the vent).

In some embodiments, the activation mechanism (e.g., cord) can activate the deflation vent by at least partially removing a cover from the deflation vent. For example, such embodiments may include a cord coupled to (e.g., adhesive, lock and loop, or other coupling mechanisms that can be permanent or temporarily removable) a tear-away cover for one or more deflation vents.

Such a cover can, for instance, be made of the same material as the inflatable member. In various embodiments, the cover may be reapplied to the deflation vent in order to reinflate the inflatable member.

The activation mechanism (e.g., cord) can, in one or more embodiments, activate the deflation vent by at least partially pulling a plug from the deflation vent. For example, the plug can resemble a larger version of a plug on an inflatable beach ball. In such embodiments, a nozzle into which the plug fits can be configured to be coupled to an inflation source (e.g., a fan) for reinflation after capture of a vehicle and/or deflation in response to vehicle impact.

One example of a deflation vent can include a flap-type cover releasably attached over an aperture in the apparatus (e.g., an aperture in an inflatable structure or the inflatable base that provides fluid communication between an interior and an exterior thereof). In such embodiments, the flap-type cover can be a flap of material that remains over the aperture until the vehicle impact to the target area occurs.

A flap-type cover can be distinguished from a tear-away cover in that at least one portion of a flap-type cover may remain attached to the inflatable structure when the deflation vent is activated (e.g., open). For example, when a deflation vent is activated, a tear-away cover may be completely removed from the inflatable structure. In contrast, a flap-type cover may remain at least partially attached (e.g., along one edge of a four-edge cover) and at least partially removed. Embodiments are not limited to these examples of covers.

In various embodiments, the cover can be releasably attached over the aperture in various manners. For example, a fastener such as a hook and loop fastener (e.g., Velcro) or a number of magnets, among others, can be used to maintain the vent in a closed position prior to the vehicle impact. In some magnet type embodiments, the magnet concept can be activated by the deformation of the seal due to the shape change of the inflatable structure after impact.

In such embodiments, an increased pressure within the apparatus due to the vehicle impact can cause the cover to detach as the fluid within the apparatus is exhausted through the aperture. Embodiments of the present disclosure are not limited to a particular type of deflation vent.

In a number of embodiments, the activation mechanism can activate the deflation vent by reversing the inflation source. For example, an inflation source (e.g., a fan) may be coupled to the inflatable structure via a two-way valve (e.g., a deflation vent when operated in the reverse direction). In such embodiments, when the activation mechanism reverses the inflation source, fluid can be removed (e.g., pumped out) of the inflatable structure to provide additional dampening to at least partially absorb the energy of the impact of the vehicle.

In various embodiments, the activation mechanism can activate the deflation vent by operating an inflation source such that the pressure within one or more of the inflatable support members increases to a point where a blow-off valve (e.g., deflation vent) opens (e.g., releases fluid from the inflatable member). For example, a vehicle impacting the inflatable structure can cause a cord to flex, as described above, thereby tripping a sensor, which can indicate to a controller that the cord is flexed.

In this example, the controller can signal an inflation source to increase the pressure within the inflatable structure to cause a blow-off valve to open. A blow-off valve can, for instance, be configured to release sufficient fluid in a period of time such that the inflatable structure can deflate to dampen the impact of a vehicle (e.g., a UAV).

In some embodiments, the activation of the collapse could, for example, be automatically initiated by the landing control system. In such embodiments, this could be accomplished just prior to impact, or when a vehicle comes within a certain proximity of the device target area, among other times.

In various embodiments, the apparatus can include one or more sensors coupled to at least one of the number of deflation vents. In such embodiments, the sensor can send a signal to a controller indicating that one or more deflation vents have been activated (e.g., is open). For example, in embodiments in which the vent includes a cover over an aperture as described above, physical release of the cover from over the aperture can cause the sensor to send such a signal.

In response to the signal from the sensor, the controller can cause the inflation source to be shutdown. In various embodiments, shutting down the inflation source upon impact of the vehicle to the target area can be desirable and/or beneficial.

For example, once a vehicle has impacted the apparatus, further inflation of the apparatus can cause damage to the vehicle and/or its payload. Therefore, in various embodiments, the fluid within the apparatus is exhausted through the deflation vents upon impact of the vehicle and the apparatus remains in a deflated state until the vehicle is recovered.

In various embodiments of the present disclosure, the apparatus can include a number of wired and/or wireless sensors. For instance, in some embodiments, the apparatus can include a strain gauge sensor coupled to at least one of the number of cords and/or the netting portion.

In such embodiments, the opening or closing of a number of deflation vents can be based on a strain change (e.g., flexing) detected by the strain gauge sensor. For example, a detected rise in strain (e.g., due to a vehicle impact) for one or more cords can trigger the opening of a number of deflation vents.

In various embodiments, the inflation source can be controlled based on the strain gauge sensor information. For instance, the amount of fluid provided by the inflation source can be adjusted to maintain a particular pressure within the apparatus and/or a number of its inflatable support members. In such embodiments, a detected rise in strain may also trigger a shutdown of the inflation source.

In some embodiments, the apparatus can include a capture mechanism. For instance, in such embodiments, a vehicle (e.g., an UAV) can include a capture component to releasably attach with a corresponding capture component of the inflatable structure and/or netting portion associated therewith. As an example, a UAV can have a hook and loop fastener material on its fuselage, empennage, and/or a leading edge of one or more wings, which can releasably attach to a corresponding hook and loop fastener material located on a number of cords, an inflatable member, and/or a netting portion of the inflatable structure. Such positive capture mechanisms can, for instance, assist an activation mechanism with activating one or more deflation vents to dampen impact of a vehicle on the apparatus.

Some embodiments allow a user to retrieve a vehicle in a location that is remote from a landing strip or military base. Embodiments, for example, can be inflated using a portable air compressor that is powered from a car battery, or using a compressed fluid canister, among other implementations. The inflation can be accomplished using any suitable fluid. For example, air or other gases can be used to inflate such embodiments. In various embodiments, liquids, such as water can be used to accomplish the inflation.

An inflatable structure can be made of various materials including various nylon, plastic, and/or rubber materials. In some embodiments, the material can be coated to provide enhanced durability, landing, and/or inflation properties, among other characteristics that may be suitable to an inflatable structure. For example, one suitable coating may be silicone. In some embodiments, the inflatable material can have a weight of around 1.0-2.0 ounces per square foot.

The inflatable structure can be inflated with a fluid (e.g., a gas or liquid) provided by a number of inflation sources. Example inflation sources include a fan, blower, fluid pump, gas generator, chemical reaction, explosion, or a compressed fluid canister (e.g., pressurized), among other inflation sources.

In some embodiments, the inflation source can be an explosive source such as that used to inflate an airbag in an automobile. In some such embodiments, a solid propellant can be ignited, which burns to create a large volume of gas to inflate the bag. For example, sodium azide ($NaN_3$) may be ignited to create a large volume of nitrogen gas ($N_2$). Such propellants can rapidly burn to inflate an inflatable structure quickly, in some embodiments.

In addition to fluid movement components and propellants, in some embodiments, a chemical reaction can be used to produce the inflation of an inflatable structure. For example, a chemical reaction can be used to produce a gas or a fluid, such as foam or a liquid that can inflate an inflatable structure.

In some embodiments, the inflation source can be connected to a power source and/or may be battery operated. In some embodiments, the inflation source can be a pressure regulated compressed fluid (e.g., gas) source. The inflation source can, for example, be used to provide a pressure within the apparatus to maintain the inflatable structure in an inflated state until a vehicle impacts the target area.

In some embodiments, the power source can be used to provide the power to actuate the opening and/or closing of a vent/valve, ignite a propellant, or initiate a chemical reaction. Any suitable power source for providing such functionality can be utilized in various embodiments of the present disclosure.

In various embodiments, the pressure suitable to maintain the inflatable structure in the inflated state can be, for example, about 3-5 pounds per square inch (psi). The pressure suitable to maintain the inflatable structure in the inflated state can depend on factors such as the type of material being inflated, weight of the material being inflated, the size of the members, and/or configuration of the members, among other factors.

In some embodiments, the vehicle can be captured within the deflating material (e.g., like inside a closing catcher's mitt). For instance, if the target forms a "C" shaped cross-section, the vehicle can impact the inner back side of the "C" and the vehicle can be sandwiched between a top portion of the "C" shape and a bottom portion (e.g., a base). One of the inflatable support members can be provided as a base member in various embodiments of the present disclosure.

In some embodiments, the inflatable support member that is provided as a base, can provide a cushioning functionality which may reduce damage to the vehicle upon recovery. For example, a vehicle may impact the target and tumble downward or bounce off the target among other actions. The base can provide a cushion upon which the vehicle can rest after contacting the target.

In one or more embodiments, a vehicle energy absorption system can include a number of perimeter sensors (e.g., radar, radio frequency, sonar, etc.) and/or a detection mechanism for a vehicle identifier (e.g., a transponder) to help determine when the vehicle is within or in close proximity to the inflatable structure. Such embodiments may include the use of an automated capture mechanism (e.g., an automated instrument landing system) to assist in capturing the vehicle with the inflatable structure. For example, a number of perimeter sensors and/or a detection mechanism for a vehicle identifier can be used to activate one or more deflation vents to aid in vehicle energy absorption by the system.

DETAILED DESCRIPTION

Embodiments of the present disclosure include various methods, apparatuses, and systems for vehicle energy absorption. Various embodiments of the present disclosure will now be described in relation to the accompanying drawings, which will at least assist in illustrating the various features of the various embodiments.

Figure 1:
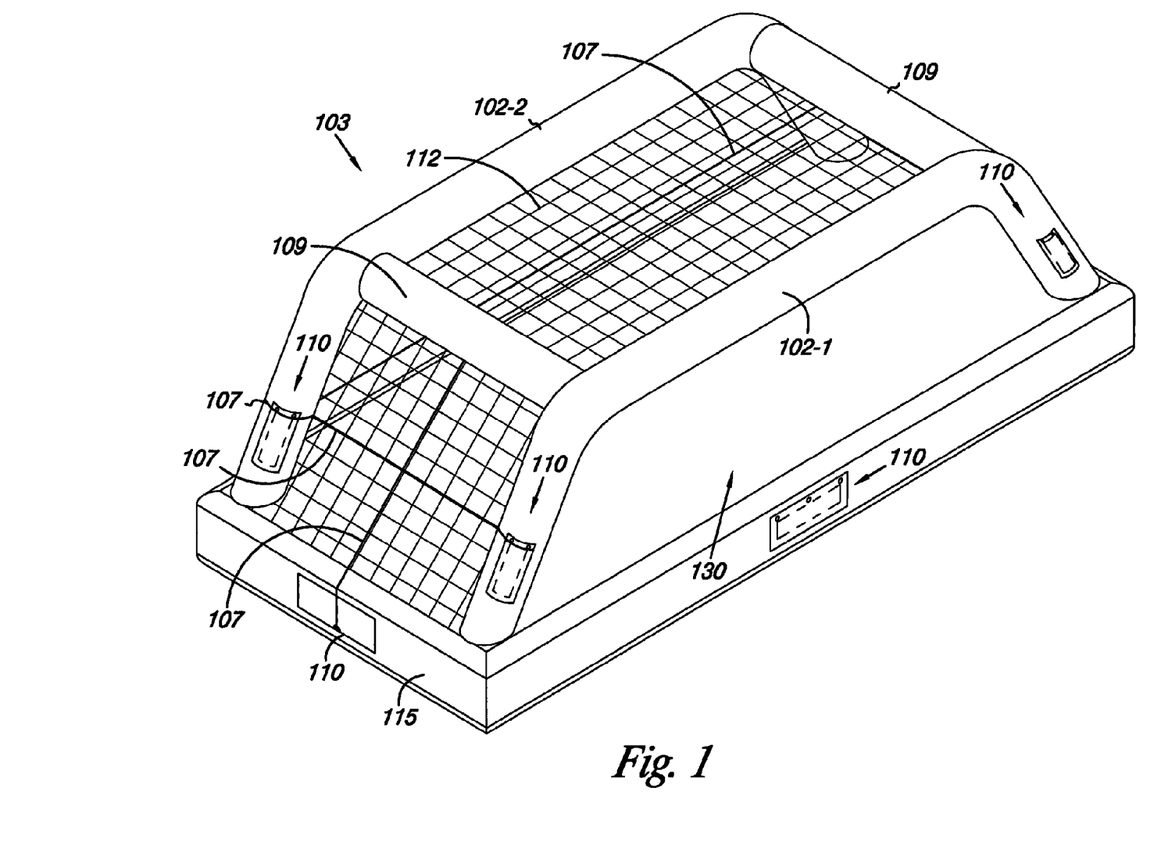
FIG. 1 illustrates a vehicle energy absorption apparatus according to an embodiment of the present disclosure.

FIG. 1 illustrates a vehicle energy absorption apparatus according to an embodiment of the present disclosure. In the embodiment illustrated in FIG. 1, the apparatus 103 can be an inflatable structure including a number of inflatable support members such as support base 115, vertical support members 102-1 and 102-2, and horizontal support members 109.

The inflatable support member 102-1, which can, in some embodiments, be in fluid communication with (e.g., coupled to) support base 115, defines a vehicle target area (e.g., a face) 130. As used herein, a vehicle target area is an area on an energy absorption apparatus (e.g., apparatus 103) where a vehicle is intended to enter and/or impact the apparatus. In the embodiment of FIG. 1, target area 130 is empty space for entry of a vehicle (e.g., a UAV).

As illustrated in FIG. 1, various inflatable support members are connected via a netting portion 112. For example, vertical support members 102-1 and 102-2 and horizontal support members 109 are connected by a netting portion 112. In the embodiment illustrated in FIG. 1, the areas bounded by each support component are connected by a netting portion 112, except target area 130.

Thus, apparatus 103 in FIG. 1 can be said to resemble a soccer goal or an envelope (e.g., a cavity with an opening into the cavity). That is, a vehicle (like a soccer ball) can enter the apparatus through face 130 (like the front of a goal) but cannot escape through the other faces created by the intersection of various support members. Although examples of vehicle energy absorption apparatuses described herein focus primarily on a "soccer goal" type apparatus, other configurations are also possible. U.S. patent application Ser. No. 11/644,141, entitled, "Vehicle Recovery," having at least one common inventor and a common assignee, describes examples of other such configurations.

Figure 4:
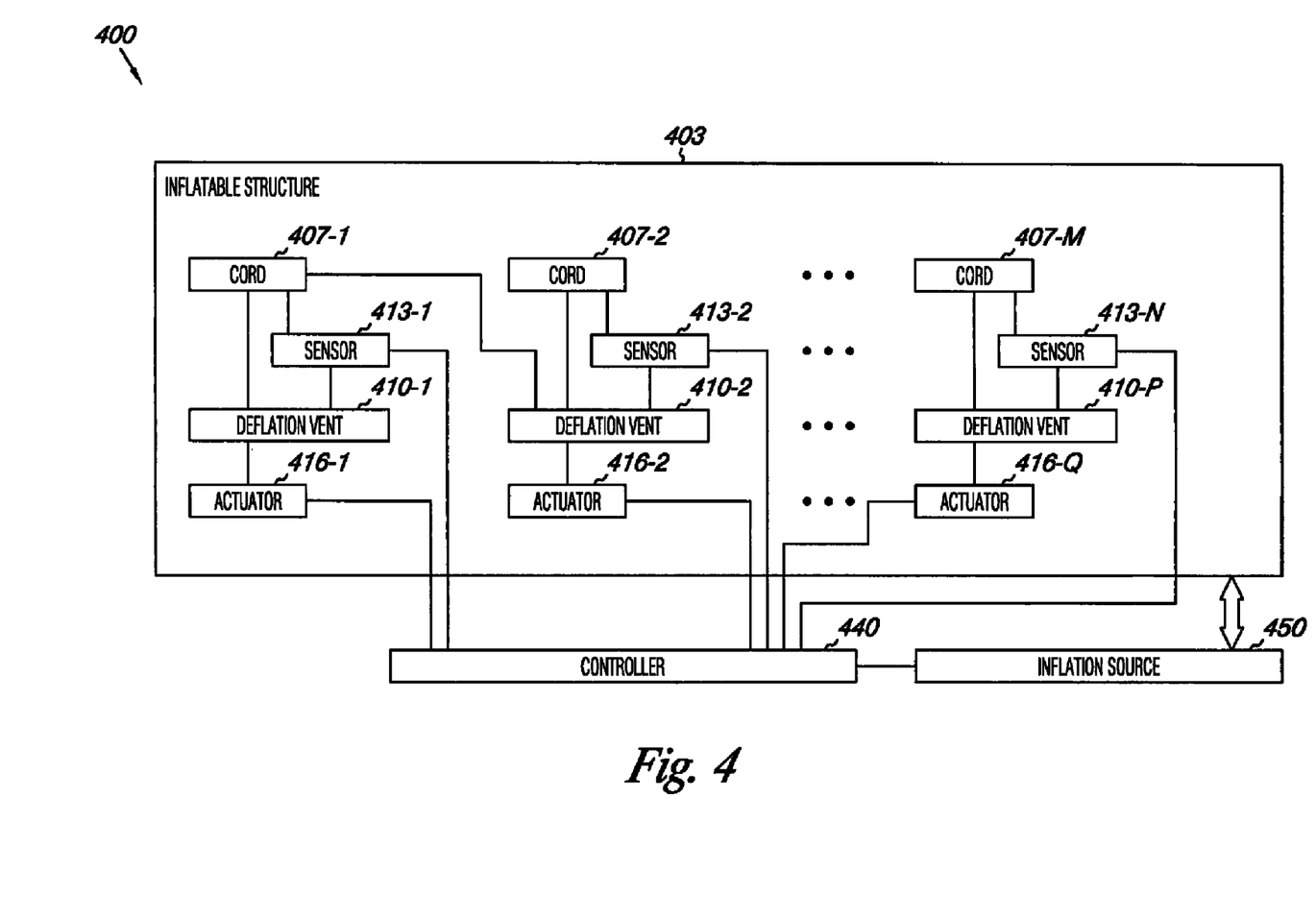
FIG. 4 is a block diagram of a system for vehicle energy absorption according to an embodiment of the present disclosure.

The apparatus 103 can be inflated with fluid (e.g., gas) provided by an inflation source (e.g., inflation source 450 in FIG. 4). The apparatus can include a number of inflation points (e.g., one-way valves and/or two-way valves) and more than one inflation source can be used to inflate the apparatus.

In the embodiment of FIG. 1, the inflatable vertical support members 102-1 and 102-2 are shown including deflation vents 110 located at a first and second end of each support member respectively. Base support member 115 is shown with a deflation vent 110 near the center of each edge.

The deflation vents 110 can be openings in any portion of the support members. The deflation vents 110 can be sized so as to maintain an inflation pressure (e.g., about 3-10 pound per square inch (psi), in some embodiments) within the support members to maintain the support members in the inflated state and/or to provide one or more particular deflation rates.

The pressure sufficient to maintain the support members in the inflated state can depend on various factors such as the material used to form the support members, among other factors. The inflatable structure can be made of various materials including various nylon fabrics which may have a coating such as a silicone coating thereon.

In various embodiments, the support members are made of a nylon fabric having a weight of about 1.0-2.0 ounces per square foot. Embodiments of the present disclosure are not limited to a particular type of support member material or to a particular inflation pressure maintained in the support members.

In the embodiment of FIG. 1, various cords 107 (e.g., nylon tethers or other attachment members) are interspersed within the netting portions 112 and attached to various deflation vents 110. In some embodiments, cords 107 can be a component of netting portion 112. That is, one strand of a netting portion 112 can function as an activation mechanism like a cord by being connected to one or more deflation vents 110.

As shown in the embodiment illustrated in FIG. 1, cords 107 can be coupled to one or more deflation vents 110. A cord 107 can function as an activation mechanism for one or more deflation vents 110 by flexing beyond a threshold amount upon impact of a vehicle (e.g., a UAV) on the cord 107 and/or other component of apparatus 103. For example, when a cord 107 flexes beyond a threshold amount, it can activate (e.g., open) a deflation vent 110 by physically opening the vent 110 and/or tripping a sensor coupled to a controller and/or an actuator that activates the deflation vent 110.

As described above, cords 107 and/or deflation vents 110 can be coupled to one or more sensors (e.g., sensor 413-1 in FIG. 4) to detect a state of the cords 107 and/or deflation vents 110. For example, a sensor can detect a state of a cord 107 as being relaxed or flexed (e.g., where the default state of the cord can be relaxed). For instance, a sensor can detect a state of one or more deflation vents 110 as being open or closed.

Although not illustrated in FIG. 1, in some embodiments, actuators (see FIG. 4 for a block diagram of a system embodiment including actuators 416) can be coupled to one or more deflation vents 110 to function as activation mechanisms by activating (e.g., opening) the vents. In embodiments having deflation vents that are not coupled to a cord 107, an actuator may be used to activate (e.g., open) the deflation vent 110. For example, in FIG. 1, deflation vent 110 located below face 130 is not coupled to a cord 107, unlike deflation vents 110 shown on the left side of apparatus 103.

In the embodiment illustrated in FIG. 1, the deflation vents 110 can be maintained in a closed state as shown, and can be opened (e.g., by operation of an activation mechanism such as a flexed cord and/or an actuator) to exhaust the fluid in the apparatus when a vehicle (e.g., UAV 320 in FIG. 3) impacts the apparatus 103. The deflation vents 110 can include a cover (e.g., cover 311 in FIG. 3) releasably attached over an aperture in various inflatable support members such as vertical support member 102-1.

In some embodiments, the covers can be attached over the apertures at the attachment points by using hook and loop fasteners on opposing surfaces of the support member and cover. Various other fastener types, such as magnets or adhesives, can be used to attach the covers over the apertures. One or more cords 107 can flex, due to the impact of a vehicle on apparatus 103, and can force the release of (e.g., pull off) a number of covers such that the fluid within a number of the support members is exhausted through a number of deflation vents.

In one or more embodiments, a deflation vent 110 can include a number of substantially parallel slats coupled (e.g., hingedly attached) to an actuator and/or cord 107 that can open, close, and/or adjust the vent between an opened and closed state (e.g., by rotating the slats along a longitudinal axis). The activation mechanism (e.g., cord 107) can, in one or more embodiments, activate the deflation vent 110 by at least partially pulling a plug from the deflation vent 110. Embodiments of the present disclosure are not limited to a particular type of deflation vent.

In some embodiments, over pressurization may be used to activate (e.g., blow) one or more deflation vents 110. For example, a flexed cord can physically be linked to an inflation source, or a sensor detecting a flexed cord an sending a corresponding signal through a controller to the inflation source, to activate the inflation source to over pressurize the apparatus 103.

Such over pressurization, for instance, could force a cover off of an aperture on a deflation vent 110 and/or trigger a blow-off valve to release fluid from the apparatus 103. Embodiments are not limited to these examples of activating vents, other options are possible.

Embodiments of the present disclosure are not limited to the configuration shown in FIG. 1. For example, various embodiments may include more or fewer deflation vents, may include differently shaped inflatable support members, and/or may include portions made from different materials, among other differences.

Vehicle energy absorption apparatus 103 can be portable for deployment in hostile environments and/or areas where more traditional vehicle recovery methods may be less suitable. Examples of the portability of such an apparatus is provided in a U.S. patent application Ser. No. 11/999,356 entitled, "Vehicle Recovery Package," and having at least one common inventor and a common assignee.

Figure 2:
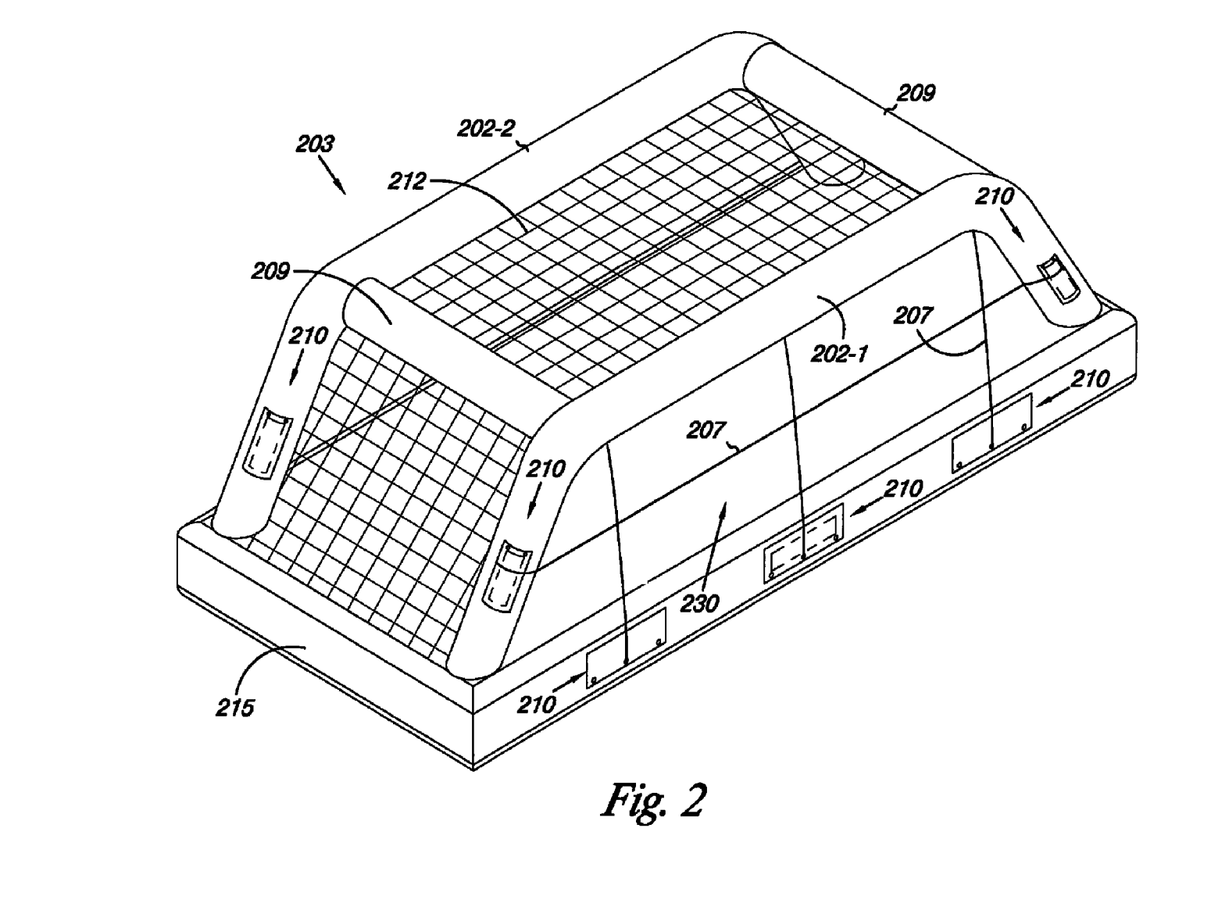
FIG. 2 illustrates a vehicle energy absorption apparatus according to an embodiment of the present disclosure.

FIG. 2 illustrates a vehicle energy absorption apparatus according to an embodiment of the present disclosure. In the embodiment illustrated in FIG. 2, the apparatus 203 can be an inflatable structure including a number of inflatable support members such as support base 215, vertical support members 202-1 and 202-2, and horizontal support members 209.

The inflatable support member 202-1, which can, in some embodiments be in fluid communication (e.g., coupled to) support base 215, defines a vehicle target area (e.g., a face) 230. In the embodiment of FIG. 2, target area 230 is crossed by a number of cords 207 that can be impacted by a vehicle (e.g., a UAV).

In some embodiments, a vehicle impacting a cord 207 may add to the overall energy absorption performed by apparatus 203. That is, a vehicle impacting a cord 207 may help to decrease the velocity of the vehicle and dampen its impact.

In the embodiment of FIG. 2, the inflatable vertical support members 202-1 and 202-2 are shown including deflation vents 210 located at a first and second end of the support member respectively. Base support member 215 is shown with a number of deflation vents 210 across the bottom edge.

Deflation vents 210 can be formed and function substantially as described above. Furthermore, apparatus 203 can include a number of sensors and/or actuators coupled to one or more cords 207 and/or deflation vents 210 substantially as described above.

As illustrated in FIG. 2, various inflatable support members can be connected via a netting portion 212. For example, vertical support members 202-1 and 202-2 and horizontal support members 209 are connected by a netting portion 212.

In the embodiment illustrated in FIG. 2, the areas bounded by each support component are connected by a netting portion 212, except target area 230. With respect to the arrangement of the netting portions 212, apparatus 203 in FIG. 2, as with apparatus 103 in FIG. 1, can be said to resemble a soccer goal.

However, the arrangement of cords 207 in the embodiment illustrated in FIG. 2 differs from the embodiment illustrated in FIG. 1. For example, cords 207 are arranged in a crossing matrix over target area 230. One cord 207 is, for example, coupled horizontally between opposite sides of vertical support member 202-1 at deflation vents 210. Other cords 207 can be, for example, coupled vertically between vertical support member 202-1 and base support member 215 at deflation vents 210.

The specific arrangement of cords 207 illustrated in FIG. 2 is an example and other arrangements are possible according to embodiments of the present disclosure. For example, an amount of space between cords 207 in the crossing matrix can depend on such factors as the location of a number of deflation vents 210 to which the cords 207 are attached and/or the size of a vehicle to be recovered, among other factors. In some embodiments, the crossing matrix of cords 207 may include one or more cords that are not attached to a deflation vent 210, but are connected to another cord 207 such that when one cord flexes the other does as well causing at least one deflation vent 210 to open.

The arrangement of cords illustrated in FIG. 2, for instance, can be useful in increasing the likelihood that a cord is flexed when a vehicle (e.g., vehicle 320 in FIG. 3) impacts the vehicle energy absorption apparatus 203. For example, a vehicle (e.g., a UAV) can enter target area 230 and in the process impact one or more cords 207, causing the cords to flex.

As described above, when a cord 207 flexes beyond a threshold amount (e.g., from impact of a vehicle thereon, or on the apparatus 203) one or more deflation vents 210 can be activated (e.g., opened). For example, in embodiments where deflation vents 210 include tear-away covers over apertures, an impact of a vehicle on a cord 207 attached to such a deflation vent 210 can cause the cord 207 to flex thereby tearing off the cover and/or opening the flap to release fluid (e.g., air) from the apparatus 203.

Figure 3:
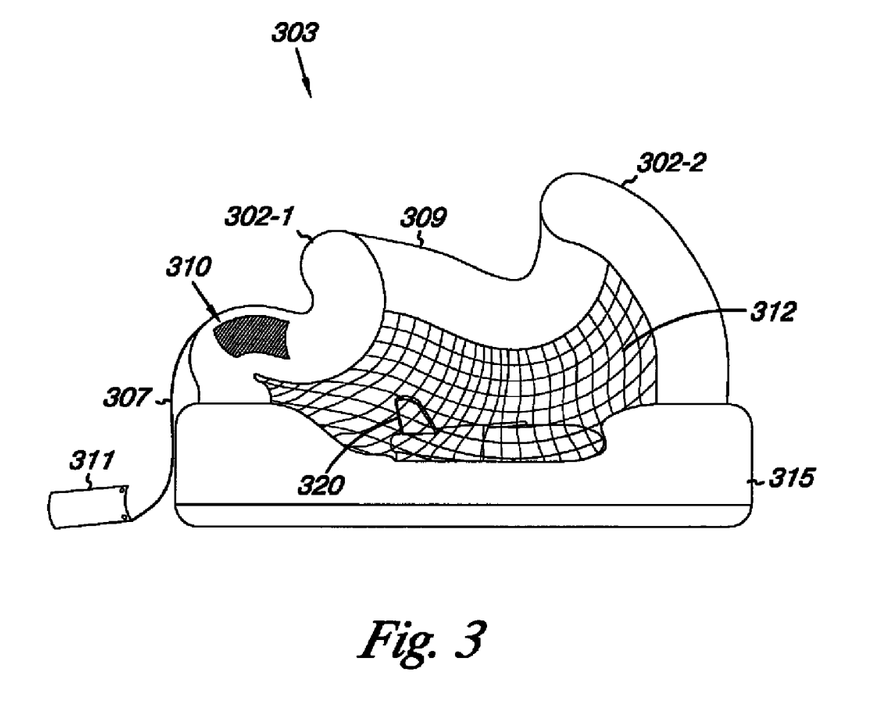
FIG. 3 illustrates an inflatable structure having a vent in an open state according to an embodiment of the present disclosure.

FIG. 3 illustrates an inflatable structure having a vent in an open state according to an embodiment of the present disclosure. The embodiment illustrated in FIG. 3 shows an apparatus 303 (e.g., apparatus 103 shown in FIG. 1, or apparatus 203 shown in FIG. 2) in a partially deflated state.

That is, the embodiment illustrated in FIG. 3 illustrates an energy absorption apparatus 303 after the vehicle 320 has impacted the target area (e.g., target area 130 shown in FIG. 1 or target area 230 shown in FIG. 2). In such embodiments, the inflatable structure (e.g., vertical support members such as 302-1 and 302-2, inflatable base support 315, and horizontal support members 309) has collapsed around the vehicle 320 as the fluid within the apparatus has been exhausted through a number of deflation vents (e.g., deflation vent 310).

The embodiment illustrated in FIG. 3 depicts a vehicle 320 captured within apparatus 303 (e.g., at least partially in netting portion 312). In the illustration of FIG. 3, the vehicle 320 has come to rest after apparatus 303 has absorbed its energy. For example, vehicle 320 can have impacted a cord 307 and/or another portion of the apparatus 303, causing cord 307 to flex and activate a deflation vent 310 by tearing off a cover 311 thereby releasing fluid from one or more inflatable support members and at least partially deflating the apparatus 303.

Deflation vent 310, as illustrated in the embodiment of FIG. 3, is in an activated (e.g., open) state. An activated deflation vent 310 can include one or more apertures (e.g., openings) in the inflatable structure.

Embodiments are not limited to deflation vents that include tear-away covers as illustrated in FIG. 3. Deflation vents 310 can be formed and function substantially as described above. Furthermore, apparatus 303 can include a number of sensors and/or actuators coupled to one or more cords 307 and/or deflation vents 310 substantially as described above.

FIG. 4 is a block diagram of a system for vehicle energy absorption according to an embodiment of the present disclosure. In the embodiment illustrated in FIG. 4, the system 400 can include an inflatable structure 403. The structure 403 can include various cords (e.g., cords 407-1, 407-2, . . . , 407-M), sensors (e.g., sensors 413-1, 413-2, . . . , 413-N), deflation vents (e.g., deflation vents 410-1, 410-2, . . . , 410-P), and/or actuators (e.g., actuators 416-1, 416-2, . . . , 416-Q). The designators "M", "N", "P", and "Q" are used to indicate that the system 400 can include a number of cords, sensors, vents, and/or actuators.

Embodiments are not limited to the specific layout of system 400 illustrated in FIG. 4. Various embodiments can include more, different, or fewer components than are illustrated in FIG. 4.

The inflatable structure 403 can, for example, be a vehicle energy absorption apparatus embodiment such as those described above in connection with FIGS. 1-3. The system 400 can include an inflation source 450 bidirectionally coupled to provide and/or remove a fluid (e.g., gas) to and/or from structure 403 according to embodiments described herein.

In the embodiment illustrated in FIG. 4, the system includes a controller 440 coupled to the inflation source 450 and sensors 413-1, 413-2, . . . , 413-N. The controller 440 can be coupled to a number of actuators 416-1, 416-2, . . . , 416-Q. In various embodiments, the controller 440 can monitor the actuators and/or the sensors. In some embodiments, the controller 440 can control the operation of the inflation source 450 and/or a number of deflation vents/valves of structure 403 as described herein.

The actuators 416-1 through 416-Q can include various electronic and/or mechanical actuators that can respond to signals from the controller 440. In various embodiments, an actuator can activate (e.g., open) one or more deflation vents (e.g., deflation vents 410-1) in response to a signal from the controller 440.

For instance, an electrical or mechanical actuator can be coupled to one or more deflation vents (e.g., deflation vent 410-1). In such embodiments, operation of the actuator, such as opening and/or closing, can be based on the state of the vent (e.g., whether the vent is opened or closed).

In some embodiments, one or more cords (e.g., cord 407-1) may be coupled to a number of sensors (e.g., sensor 413-1) which can detect a flexing of the cord (e.g., in response to vehicle impact to the cord 407-1 and/or other component of inflatable structure 403). In such embodiments, a sensor can send a signal to the controller 440 indicating that a cord is flexed beyond a threshold amount, and the controller 440 can send a signal to one or more actuators instructing that one or more deflation vents be activated (e.g., opened).

According to various embodiments of the present disclosure, one or more cords (e.g., cord 407-1) can be physically coupled to a number of deflation vents (e.g., deflation vents 410-1 and 410-2). As shown in the embodiment illustrated in FIG. 4, the cord 407-1 is coupled to two deflation vents, while cords 407-2 and 407-M are coupled to one deflation vent. Embodiments are not limited to a cord being connected to any particular number of deflation vents. In some embodiments one cord may be connected to all deflation vents.

When a cord (e.g., cord 407-1) is flexed (e.g., as can result from impact of a vehicle on the cord or other component of the inflatable structure 403) it can activate one or more deflation vents as described herein. In some embodiments, impact of a vehicle can cause a cord to flex such that it removes a tear-away cover from an aperture on one or more deflation vents.

The sensors 413-1, 413-2, . . . , 413-N can include various types of sensors such as pressure sensors, motion sensors, and/or strain gauge sensors, among other types of sensors. For example, one or more sensors (e.g., sensor 413-1) can be coupled to a number of cords (e.g., cord 407-1) and/or a number of deflation vents (e.g., deflation vent 410-1). The sensors can be communicatively coupled to the controller 440.

As discussed above, in various embodiments, a number of sensors 413-1 to 413-N can be used to detect when a cord (e.g., cord 407-1) is flexed beyond a threshold amount indicating that a vehicle has impacted the structure 403 and/or the target area thereof. For example, in various embodiments, a strain gauge sensor can be coupled to a cord (e.g., cord 407-1). In such embodiments, a vehicle impact to the cord and/or structure can cause the cord to flex thereby increasing and/or decreasing a strain therein that can be detected by the strain gauge.

In some embodiments, the controller 440 can send a signal to one or more actuators (e.g., actuator 416-1) to activate one or more deflation vents (e.g., deflation vent 410-1) after the controller 440 receives a signal from a sensor (e.g., sensor 413-2) indicating that at least one deflation vent (e.g., deflation vent 410-2) has been activated. For example, if a vehicle impacts a cord 407-2 causing the cord 407-2 to activate deflation vent 410-2, sensor 413-2 can detect the activation and appropriately signal the controller 440.

In response, the controller 440 can signal one or more other actuators (e.g., actuator 416-1) to activate one or more other deflation vents (e.g., deflation vent 410-1). Such embodiments may be useful, for example, to more rapidly and/or evenly deflate the inflatable structure 403 than in some embodiments where one, or perhaps few, deflation vents are activated in response to a vehicle impact.

The sensor information (e.g., a signal indicating a flexed cord) provided from the sensor (e.g., sensor 413-1) to the controller 440, can be used to control a number of deflation vents (e.g., deflation vent 410-1) and/or the inflation source 450. For instance, in various embodiments, the controller 440 can, based on the detected flexed cord, shut the inflation source down and/or cause a number of deflation vents of inflatable structure 403 to be activated (e.g., opened) to facilitate rapid exhaustion of the fluid within the apparatus. In some embodiments, the controller 440 can, based on the detected flexed cord, increase inflation from the inflation source 450 such that one or more deflation vents are forced open (e.g., a blow-off valve is opened due to an increase in pressure).

In various embodiments, the inflation source can be controlled by the controller 440 based on pressure sensor information. For instance, the amount of fluid provided by the inflation source 450 can be adjusted to maintain a particular pressure within the inflatable structure 403.

Functionality can be accomplished by logic circuitry and/or a processor in which executable instructions can be executed to perform an action based upon information, for example, from the number of sensors. The executable instructions can be provided in memory or embedded in the circuitry of, for example, the controller 440.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the present disclosure. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the present disclosure includes various other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A vehicle energy absorption apparatus, comprising:
an inflatable structure for impact of a vehicle thereon; and
one or more cords directly connected to one or more deflation vents on the inflatable structure, where at least one of the cords is an activation mechanism to activate the deflation vent upon impact of the vehicle where the inflatable structure includes a number of inflatable support members connected by at least one netting portion, where the netting portion is configured to remain connected to the number of inflatable support members after impact of the vehicle, and where the one or more deflation vents are configured to detach from the apparatus along with at least a portion of the one or more cords after impact of the vehicle.

2. The apparatus of claim 1, where the inflatable structure includes a number of inflatable support members, and where at least one cord is directly connected to a deflation vent on more than one inflatable support member.

3. The apparatus of claim 1, where at least one of the one or more cords is one selected from the group including: a component of the at least one netting portion; and a component interspersed within components of the at least one netting portion.

4. The apparatus of claim 1, where the activation mechanism activates the deflation vent to at least partially deflate the inflatable structure when impact of the vehicle deforms the inflatable structure sufficiently to cause the cord to flex.

5. The apparatus of claim 1, where the activation mechanism activates the deflation vent upon impact of the vehicle on the cord causes the cord to flex.

6. The apparatus of claim 1, where the activation mechanism activates the deflation vent by one selected from the group including: at least partially opening the deflation vent; at least partially removing a cover from the deflation vent; and at least partially pulling a plug from the deflation vent.

7. A vehicle energy absorption system, comprising:
an inflatable structure, including:
a number of cords directly connected to a number of deflation vents;
a number of sensors coupled to the number of cords, the number of deflation vents, and a controller; and
a number of actuators coupled to the number of deflation vents and the controller; and
the controller having logic for controlling the number of actuators, where logic of the controller:
receives a signal from at least one of the number of sensors indicating a status of at least one of the number of cords and at least one of the number of deflation vents; and
sends a signal to at least one of the number of actuators to activate the deflation vents when the signal from the number of sensors indicates one of the group including: at least one of the number of cords is flexed beyond a threshold amount, and at least one of the deflation vents is activated.

8. The system of claim 7, where:
the status of at least one of the number of cords is selected from the group including flexed and relaxed; and
the status of at least one of the number of deflation vents is selected from the group including open and closed.

9. The system of claim 7, where the number of actuators activate the number of deflation vents by opening the deflation vents.

10. The system of claim 7, where at least one of the number of cords is flexed by impact of a vehicle on the inflatable structure.

11. The system of claim 10, where the at least one flexed cord is directly connected to a deflation vent, and where the flexed state of the cord activates the deflation vent.

12. A method for absorbing vehicle energy, comprising:
using an inflatable structure with a number of cords directly connected to a number of deflation vents to capture a vehicle; where the inflatable structure includes a number of inflatable support members connected by at least one netting portion, where the netting portion is configured to remain connected to the number of inflatable support members after impact of the vehicle;
impacting the inflatable structure with the vehicle, causing at least one cord to flex and activate at least one deflation vent; where the at least one deflation vents is configured to detach from the apparatus along with at least a portion of the at least one cords after impact of the vehicle; and
deflating, at least partially, the inflatable structure via the at least one activated deflation vent.

13. The method of claim 12, where the method includes dampening impact of the vehicle on the inflatable structure by at least partially deflating the inflatable structure.

14. The method of claim 12, where activating the at least one deflation vent includes pulling the at least one deflation vent open via the flexed cord.

15. The method of claim 12, where causing the at least one cord to flex includes impacting the at least one cord directly with the vehicle.

16. The method of claim 12, where deflating the inflatable structure includes:
activating the at least one deflation vent via the flexed cord;

sensing the activated at least one deflation vent with a sensor coupled to the activated at least one deflation vent; and activating additional deflation vents in response to sensing the activated at least one deflation vent.

17. The method of claim 16, where activating additional deflation vents includes:

receiving a signal with a controller from the sensor coupled to the activated at least one deflation vent that indicates activation of the at least one deflation vent; and sending a signal from the controller to an actuator coupled to the additional deflation vents instructing the actuator to activate the additional deflation vents.

18. The method of claim 12, where the method includes capturing the vehicle in a netting portion coupled to the inflatable structure.

19. The method of claim 18, where capturing the vehicle in the netting portion causes at least one cord to flex and activates at least one deflation vent.

20. A vehicle energy absorption apparatus, comprising:

an inflatable structure for impact of a vehicle thereon having an envelope portion formed therein;

one or more actuators directly connected to one or more deflation mechanisms where an actuation of at least one of the actuators results in the deflation of the envelope upon impact of the vehicle; and one or more cords directly coupled to at least one of the one or more actuators where at least one of the cords is an activation mechanism to actuate the at least one of the one or more actuators upon impact of the vehicle.

* * * * *